(12) United States Patent
Araujo (10) Patent No.: US 11,999,460 B2
(45) Date of Patent: Jun. 4, 2024

(54) UNMANNED ELLIPSOID MULTI-ROTOR AIRSHIP AND RESPECTIVE METHOD OF CONSTRUCTION

(71) Applicant: ELIO TECNOLOGIA, SERVIÇOS E PARTICIPAÇOES LTDA., São Paulo (BR)

(72) Inventor: Luciano da Silveira Araujo, São Paulo (BR)

(73) Assignee: ELIO TECNOLOGIA SERVICOS E PARTICIP (BR)

( * ) Notice: Subject to any disclaimer, the term of this patent is extended or adjusted under 35 U.S.C. 154(b) by 162 days.

(21) Appl. No.: 17/166,884

(22) Filed: Feb. 3, 2021

(65) Prior Publication Data
US 2021/0188415 A1    Jun. 24, 2021

Related U.S. Application Data

(63) Continuation of application No. 15/774,266, filed as application No. PCT/BR2016/000118 on Nov. 4, 2016, now Pat. No. 10,919,610.

(60) Provisional application No. 62/251,595, filed on Nov. 5, 2015.

(51) Int. Cl.
*B64B 1/34* (2006.01)
*B64U 10/30* (2023.01)
*B64U 30/20* (2023.01)

(52) U.S. Cl.
CPC ............ *B64B 1/34* (2013.01); *B64B 2201/00* (2013.01); *B64U 10/30* (2023.01); *B64U 30/20* (2023.01); *B64U 2201/20* (2023.01)

(58) Field of Classification Search
CPC . B64B 1/34; B64B 2201/00; B64C 2201/022; A63H 2027/1066
See application file for complete search history.

(56) References Cited

U.S. PATENT DOCUMENTS

| | | |
|---|---|---|
| 6,142,414 A | 11/2000 | Doolittle |
| 6,286,783 B1 | 9/2001 | Kuenkler |
| 7,036,768 B2 | 5/2006 | Bundo |
| 7,487,936 B2 | 2/2009 | Heaven, Jr. |
| 7,866,601 B2 * | 1/2011 | Balaskovic ............... B64B 1/10 244/30 |
| 8,544,788 B1 | 10/2013 | Capper |
| D741,751 S | 10/2015 | Klaptocz et al. |
| 9,852,644 B2 | 12/2017 | Salnikov et al. |
| 10,109,224 B1 | 10/2018 | Ratti et al. |

(Continued)

FOREIGN PATENT DOCUMENTS

| | | |
|---|---|---|
| CN | 204452931 U | 7/2015 |
| DE | 10035844 A1 * | 8/2001 ............... B64B 1/22 |

(Continued)

*Primary Examiner* — Joseph W Sanderson
(74) *Attorney, Agent, or Firm* — Manatt, Phelps & Phillips, LLP (57) ABSTRACT

An unmanned and remotely controlled airship has a system of multirotors combined with an inflatable envelope. The airship may be lifted/powered by a power system that has three or more rotors. The airship may be constructed using rods, connectors, the main system/control box and the rotors. The airship system may have a systemic symmetry for weight distribution and flight control and may be, for example, a symmetric ellipsoid envelope/blimp.

10 Claims, 5 Drawing Sheets

(56) References Cited

U.S. PATENT DOCUMENTS

| | | | |
|---|---|---|---|
| 10,246,186 B1 * | 4/2019 | Beckman | B64C 39/024 |
| 10,625,842 B2 * | 4/2020 | Rapport | B64B 1/14 |
| 10,850,842 B2 * | 12/2020 | Chang | B64C 39/024 |
| 10,919,610 B2 * | 2/2021 | Araujo | B64C 39/024 |
| 2005/0279880 A1 | 12/2005 | Bundo | |
| 2008/0179454 A1 * | 7/2008 | Balaskovic | B64B 1/30 |
| | | | 244/30 |
| 2012/0248241 A1 | 10/2012 | Goelet | |
| 2012/0273608 A1 | 11/2012 | Jess et al. | |
| 2015/0266577 A1 | 9/2015 | Jones et al. | |
| 2016/0307448 A1 | 10/2016 | Salnikov et al. | |
| 2017/0021907 A1 * | 1/2017 | Rapport | B64B 1/14 |
| 2018/0319476 A1 | 11/2018 | Araujo | |

FOREIGN PATENT DOCUMENTS

| | | | | |
|---|---|---|---|---|
| KR | 20130081415 A * | 7/2013 | | B64B 1/34 |
| KR | 20130128818 A | 11/2013 | | |
| KR | 20140104303 A * | 8/2014 | | B64B 1/22 |
| KR | 20150117401 A | 10/2015 | | |
| WO | WO2014108459 A1 | 7/2014 | | |
| WO | WO2015167103 A1 | 11/2015 | | |
| WO | WO 2018228939 A1 | 12/2018 | | |

* cited by examiner

UNMANNED ELLIPSOID MULTI-ROTOR AIRSHIP AND RESPECTIVE METHOD OF CONSTRUCTION

RELATED APPLICATIONS

This application is a continuation of and claims priority under 35 USC 120 to U.S. patent application Ser. No. 15/774,266 filed May 7, 2018 that is U.S. national stage under 35 USC 371 of PCT/BR2016/000118 filed Nov. 4, 2016 that claims priority under 35 USC 119(e) to U.S. Provisional Patent Application Ser. No. 62/251,595 filed on Nov. 5, 2015 and entitled "Unmanned Ellipsoid Multi-Rotor Airship System", the entirety of all of which are incorporated herein by reference.

FIELD

The disclosure is directed to unmanned airships remotely controlled that can be symmetric and that have an ellipsoid shape.

BACKGROUND

The recent introduction of remotely controlled flying devices for civilian purposes is seen by many as a disruptive development capable of fully reorganize market sectors and revolutionize the understanding of what is operationally reachable or feasible at a certain distance.

Most unmanned aerial systems available for civilian and commercial use have as base multi-rotors structures (quadricopters, hexacopters, etc) that take-off and land vertically and fly exclusively with the power provided by batteries, engines or a combination of both.

Although promising, the current systems still face a very broad body of technical challenges relating to flight autonomy, power efficiency and mechanical misfits associated excessive vibration on flight situation. Another major concern are the problems associated with safety of fall when some breakdown is observed in the main operating mechanism of the airship.

Thus, it is desirable the development of an unmanned, ellipsoid shaped airship and it is to this end that the disclosure is directed.

DETAILED DESCRIPTION OF ONE OR MORE EMBODIMENTS

The disclosure is particularly applicable to the airship presented below together with the explanation of its configuration. It is in this context that the disclosure will be described. It will be taken in consideration, nevertheless, that the airship has greater utility since it may be built with different configurations or components, the same being within the scope of the instant disclosure.

Figure 1:
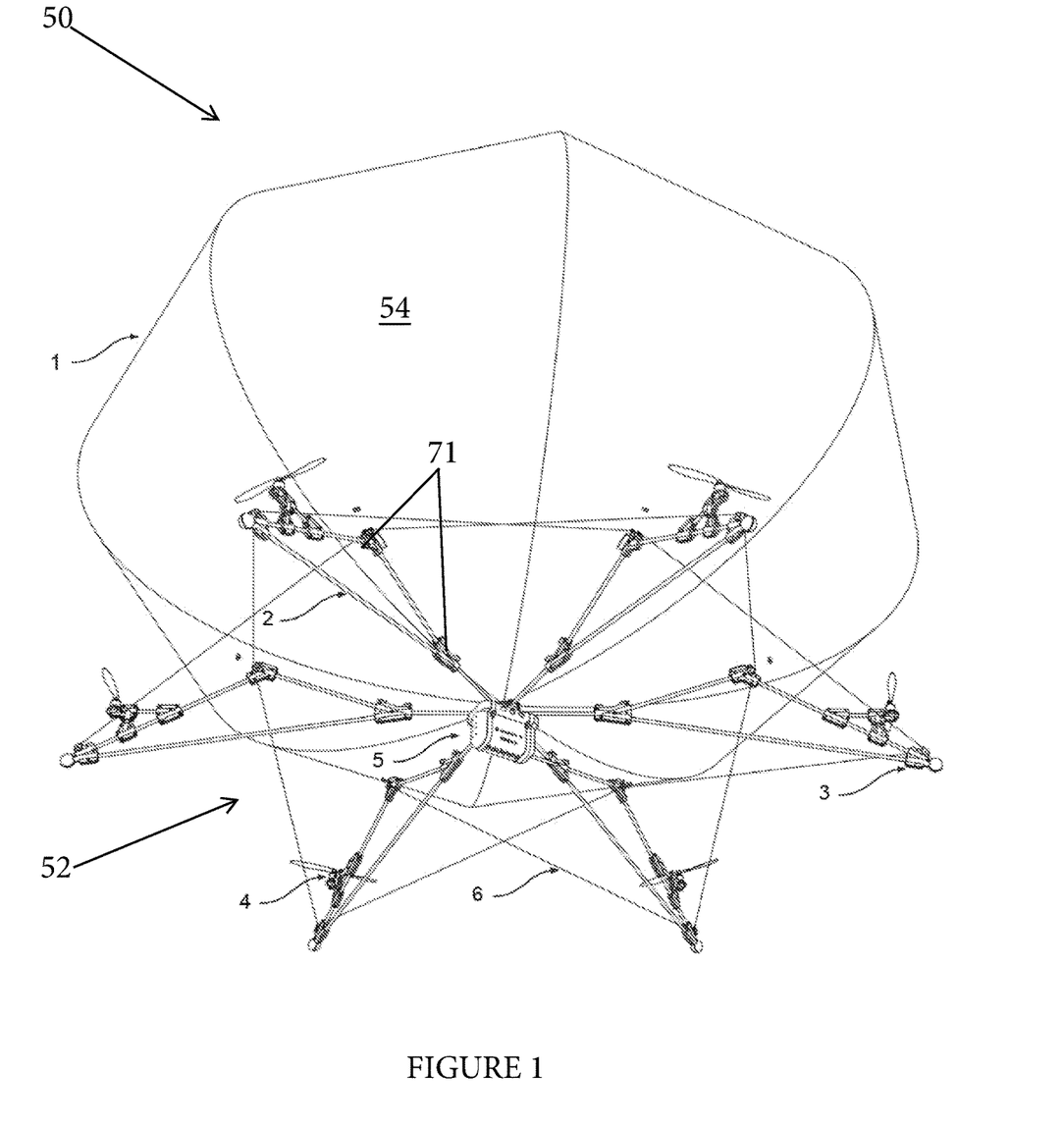
FIG. 1 is a perspective view of an unmanned ellipsoid airship.
Figure 2:
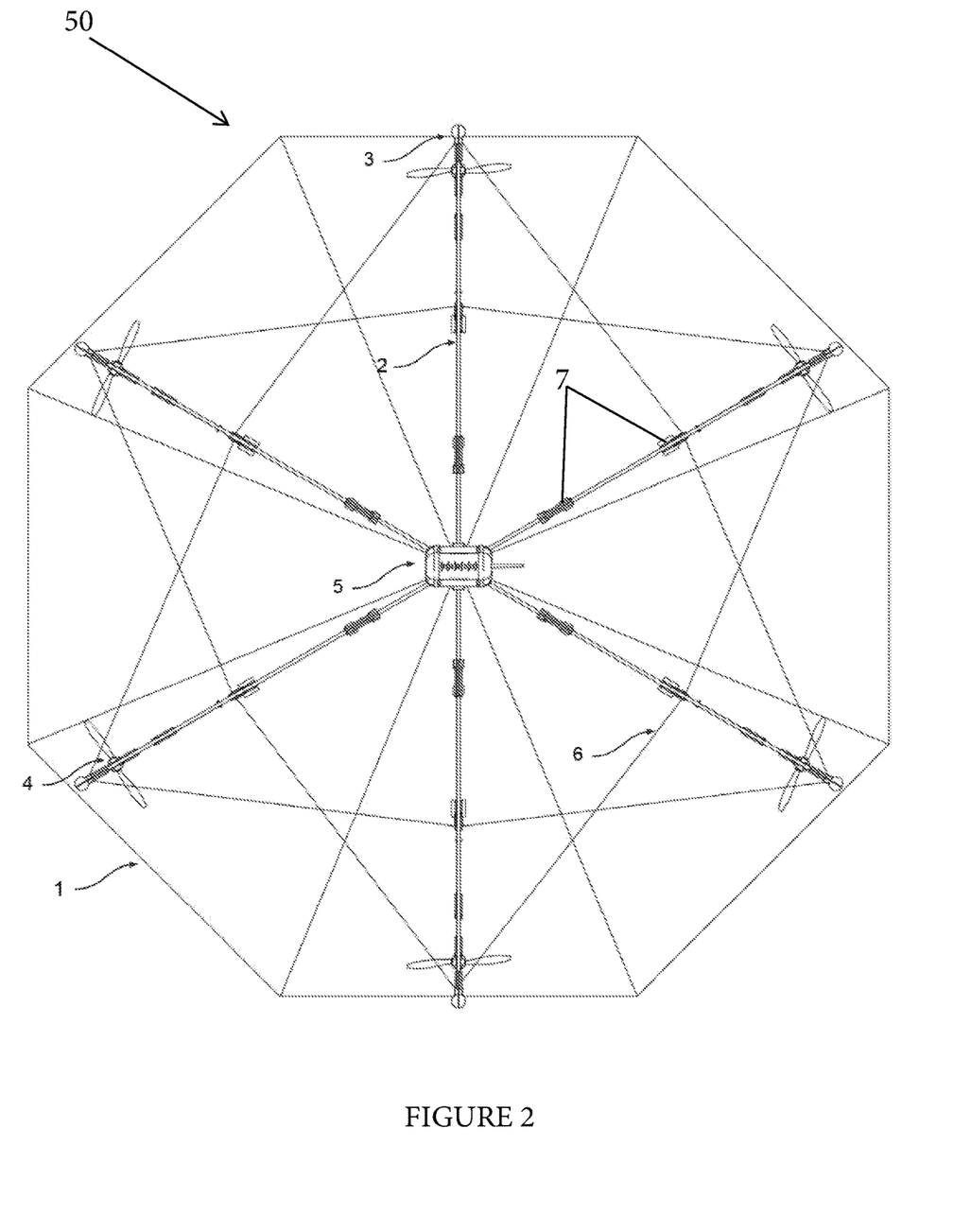
FIG. 2 is a posterior view of the unmanned ellipsoid airship.
Figure 3:
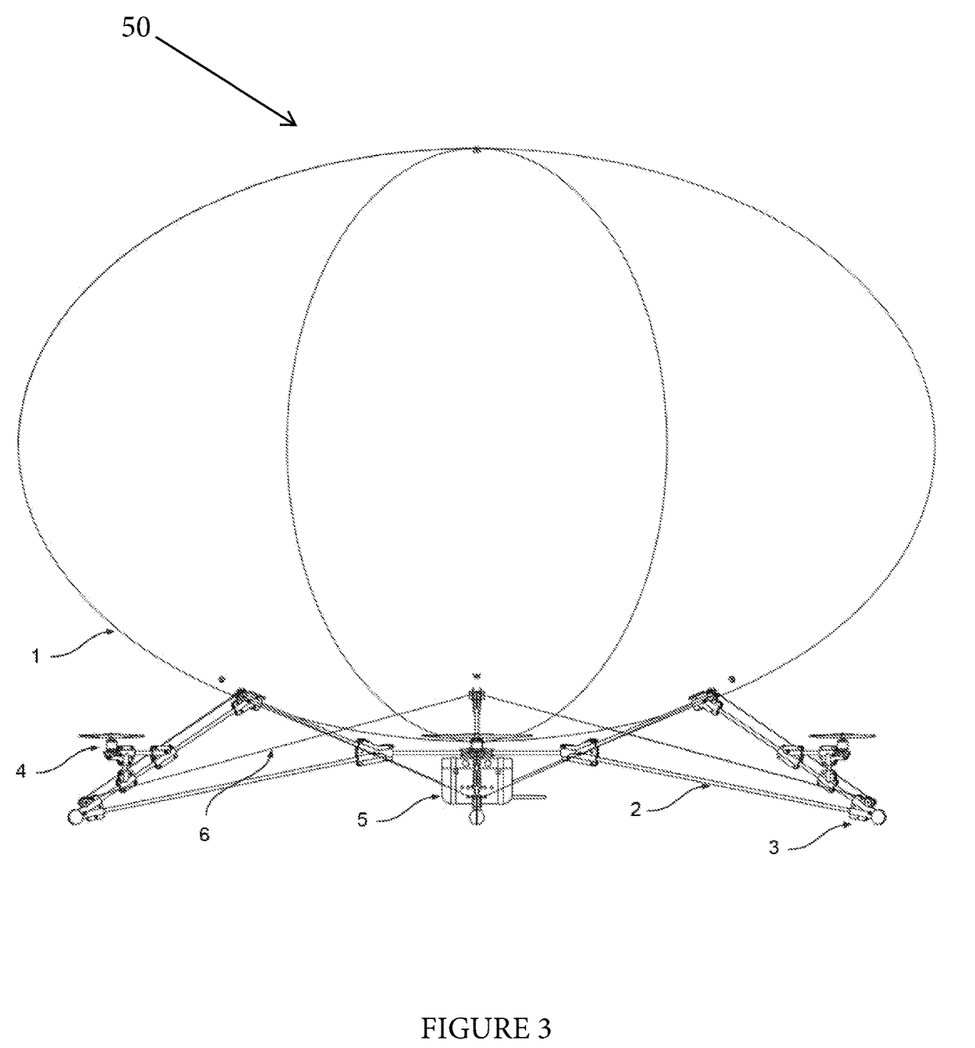
FIG. 3 is a right side view of the unmanned ellipsoid airship.

An unmanned ellipsoid airship as well as its method of construction are presented. FIG. 1 is a perspective view of an unmanned ellipsoid airship 50, FIG. 2 is a posterior view of the unmanned ellipsoid airship 50 and FIG. 3 is a right side view of the unmanned ellipsoid airship 50. The unmanned airship may also be called a multi-coptor blimp. The airship may have a component constituted from unmanned flight device 52, characterized as a multirotors system and a inflatable component 54 both connected between each other. The inflatable component may be a balloon that can be, for example, an envelope filled by helium gas. The system component of multirotors 52 may have two or more rotors 4 located around a support structure located in the periphery of body parts of the airship. The airship has then a hybrid structure composed of a component of multirotors system constituted as unmanned flying device 52 and a inflatable component 54 that provide symmetry and balance of the airship as described in more detail below. In some embodiments, the operational lift of the airship may be provided 70-90% by the inflatable portion and 30-10% by the rotors and propellers of the drone portion.

The envelope ellipsoid geometry 1 has specific aerodynamics that determines the airship's operational characteristics and maneuverability. Specifically, the shape of the inflatable portion 54 has a symmetric shape that efficiently distributes, in a radial way, the forces applied by the base structure when landed or landing, as it does when the base structure is pushing the inflatable portion up through the rotors action.

The dimension of envelope 1 may vary from 2.5 m to 10 m in diameter. The volume of helium gas needed to fill the envelope depends on its dimensions and also on the most adequate level of pression that the airship needs to perform specific functions. This pression level may vary from 1.3 inAq to 2.0 inAq. Considering the risks of using hydrogen, helium is the only gas advisable for this sort of application. The integrity of connection and system symmetric property is assured by the multirotors system component attachment to the envelope center and to the six structural rods. The multirotors system component is fixed to envelope by the use of Hellerman type seals.

The multirotors system component 52 has a rigid base structure that holds the two or more rotors 4 and a control car 5. The various components of the rigid base portion may be connected to each other using a plurality of rods 2 as shown. The rigid base portion may also have one or more connectors 71 that connect the various rods 2 to each other to form the rigid base portion. Some of the connectors 71 also connect the components of the rigid base portion to the inflatable portion 54. The connectors, in some embodiments, are specifically designed and manufactured (3D printed) in ABS plastic for this particular system. The connectors may be connected to the envelope 1 by commercially available Hellerman type seals. As shown in FIG. 2, the rigid base portion may have, in one embodiment, a star configuration with the control car 5 at the center of the star and the two more rotors 4 towards the ends of the legs of the star. The particular configuration of the rigid base portion is shown in FIG. 1, but the rigid base portion may have other configurations that are within the scope of the disclosure.

The control car 5 may contain the various electronics (such as a processor, memory and other circuitry) and power sources for powering and controlling the various components of the multirotors system as well as any device for the capture of images or other information forms. The rigid base structure, among other things, distributes the thrust mechanically provided by the number of propellers available and also functions as landing gear. The structure design aims to produce an effect bringing both firmness and flexibility to the complete airship system, improving the allocation of thrust force supplied by the combined effect of rotors and envelope and, in a situation of abrupt bouncing absorbing the impact tension on critical conditions as the ones of landing without the presence of any sort of motorization.

The airship 50, being a hybrid flying equipment, has specific characteristics of a dirigible airship in terms of flight security (safer operations in low speed in stationary conditions; low relative weight—once in flight it almost equals the total payload) and of a multi-copter system (vertical takeoff and landing; almost immediate steering response in all three directional axes, XYZ, allowing for more controlled and effective maneuvers). For example, the device may weigh, with no extra load (e.g, unladen), from 6.5 kg (2.5 m diameter version) to 102.0 Kg (10 m diameter).

As shown in FIGS. 1-3, the inflatable portion 54 may take various particular forms in different modalities. The inflatable portion 54 may also have other shapes that are within the scope of the disclosure. The inflatable portion 54 may be manufactured out of pure polyurethane that may have a thickness of 0.2 mm to provide sufficient strength to prevent punctures or other loss of the lifting gas.

Figure 4:
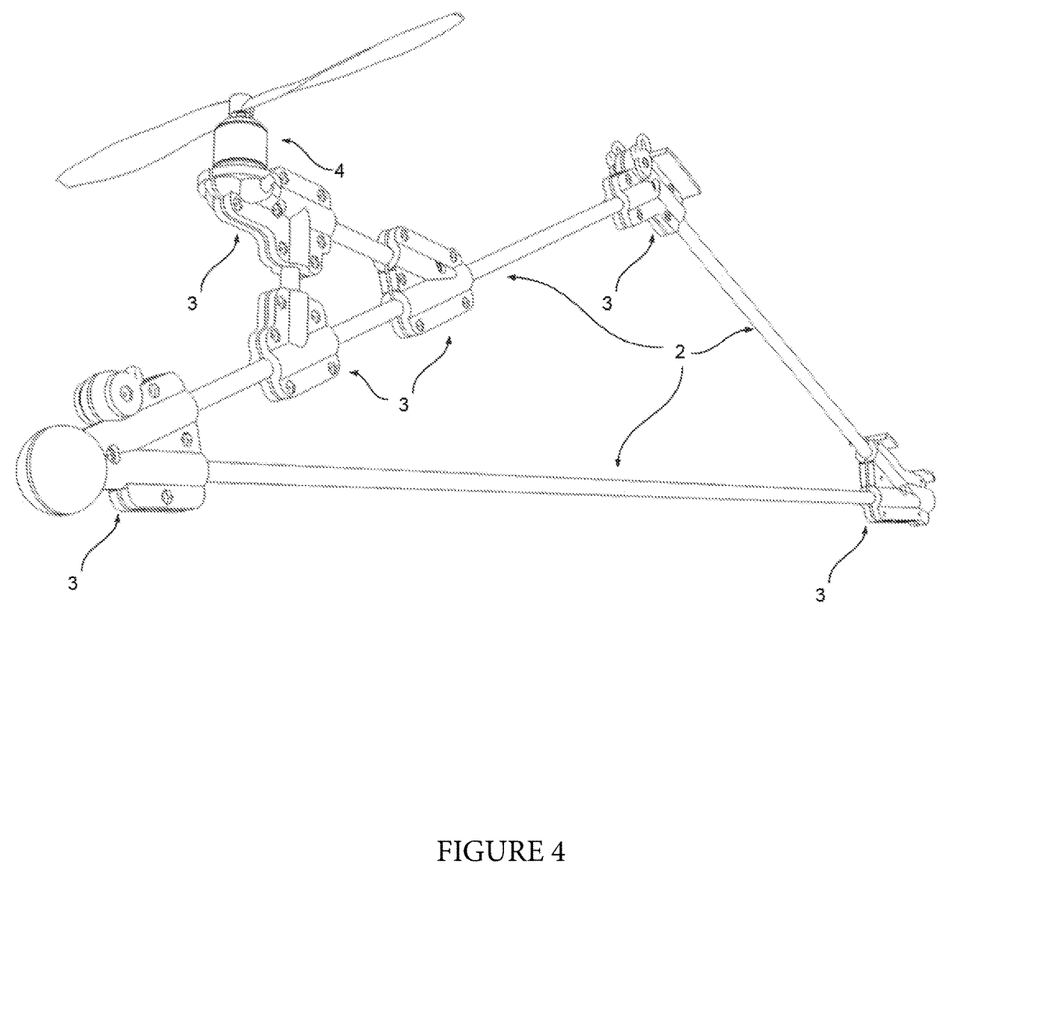
FIG. 4 is a perspective view of the structure module that is part of the unmanned ellipsoid airship.

FIG. 4 is a perspective view of more details of a portion of the structure module and the rigid base portion that is part of the unmanned ellipsoid airship. As shown in FIG. 4, the rigid base structure may be made of the rods 2 that may be, in some specific modalities, carbon fiber tubes. The rigid base structure also may have one or more fixation joints/brackets 3 that may be made, in some specific embodiments, out of 3D printed ABS plastic. The joints and brackets may be specifically designed and manufactured for this system. The rods 2 are commercially available through a set already established of possible providers.

The rods 2 may be attached to the joints 3 through the compression provided by screws made from nylon or stainless steel. In some embodiments, the rods 2 (carbon tubes) may receive thermo-retractable plastic gaskets on every extremity that will be connected to the joints 3. The gaskets increase pression and reduce micro-vibrations on these particular areas. As a final stabilizing element, the structure is bound and slightly tightened by non-elastic Dynema cables 6 (as shown in FIGS. 1-3) and fixed with plastic ABS parts and stainless steel plugs.

Figure 5:
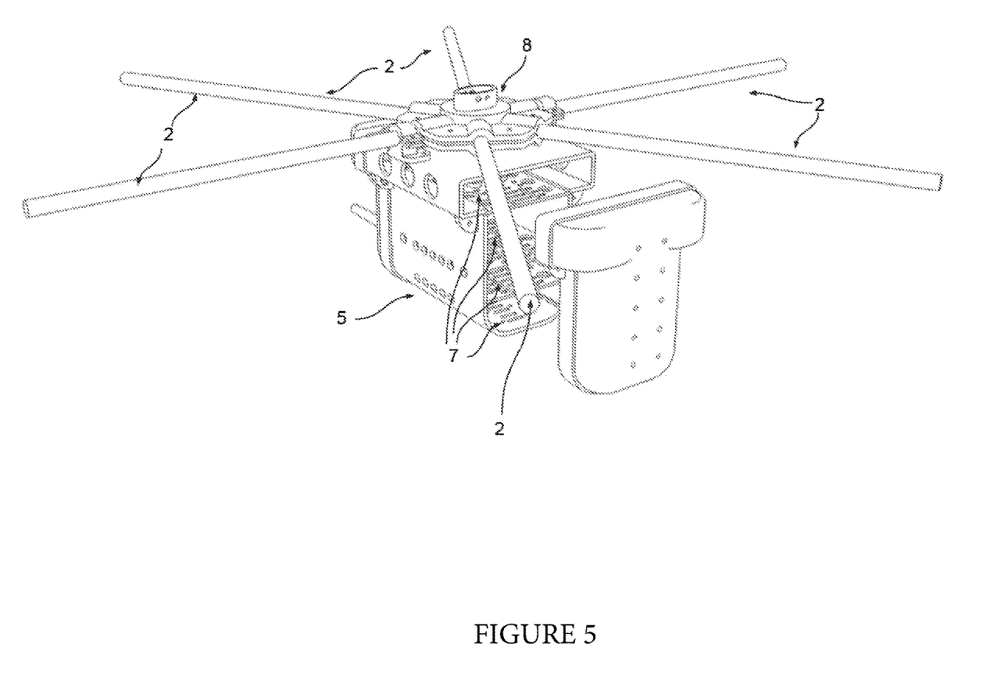
FIG. 5 is a perspective view of the control car that is part of the unmanned ellipsoid airship.

FIG. 5 is a perspective view of more details of the control car 5 (also known as a control box) that is part of the unmanned ellipsoid airship. In some of its embodiments, the control car 5 may be 3D printed in ABS plastic using fused deposition modeling (FDM) technology. The control car 5 may have one or more internal racks 7, such as four internal racks shown in the embodiment in FIG. 5. A first rack may hold flight electronics, such as a 2.4 gHz radio system receiver for communicating with the pilot on the ground, the telemetry receiver and transmitter, the digital compass system, the accelerometer and the GPS. A second rack may hold the electronic control station (autopilot) and one of more processors that control the airship and its operations, a third rack may have the battery and a fourth rack may have an energy distribution module. The imaging equipment and other sensors may be externally attached in many positions to the control car 5, once it was projected with many extra fixing holes specifically aimed to that purpose. The control car 5 also may have one or more well-known commercially available electronic speed controllers (ESC) such as six in one embodiment that may be attached to the tubes 2 by Hellerman nylon seals. The purpose of the ESCs is to control the speed of each rotor.

The control car 5 may have an external area that has an attachment joint 8 that also may be made in 3D printed in ABS plastic using fused deposition modeling (FDM) technology. This joint secures the structural carbon fiber tubes 2, also serving as connection device to the envelope's central axis. The structure is connected to the envelope using Hellerman type seals in seven different points—six of them located at the top of each rod structure (leg) and the seventh on the center, over the control car. The tubes 2 may be attached to the joints through the compression provided by screws made from stainless steel. In order to produce a better force distribution effect, washers are deployed in conjunction with the screws. The carbon tubes 2 may receive thermo-retractable plastic gaskets on the extremities that will be connected to the joint with the purpose of increasing grip and to reduce micro-vibrations on these particular areas.

The system flight is the effect of adding rotors (10 to 30% from the lifting traction) to the density difference between the earthly atmosphere and the helium gas contained on the aircraft envelope (90 to 70% from the lifting traction). The airship symmetric form has a major role in increasing stability since it equalizes the system weigh distribution during both flight and rest. It also allows the systems maneuverability to be vectorally provided by the combined differences in speed and rotation directions of the many rotors.

Everytime the aircraft is flying in any direction in a straight and horizontal position—being from 5° to 45° to the system resting (aligned to the soil) horizontal axis—the systems geometry produces an effect of weigh compensation by using the higher pression on the, at this moment, frontal inferior part of the envelope at this moment to assist on the positioning of the rotors on the opposite side, on the posterior/rear part of it. At the same time, the straight and horizontal position flight creates a low pression zone on the superior part of the system creating an "wing" or aerodynamic lift effect. In addition, the design of each of the envelope's segments make them work as keels that diminish the rotating laminar flow may occur on this kind of geometrical aircraft, reducing the formation of dragging vortices that may compromise the system stability.

In case of a general rotor breakdown, the envelope shape will produce a parachute effect that combined with the helium gas lifting thrust will decrease the speed of the falling aircraft, making it safer than most of the currently known remotely controlled unmanned flying devices. The take-off and landing process are produced by the gradual increase or decrease on the speed of the rotors propellers. The rigid structure has shock absorption characteristics derived from both the weight equalizing effect provided by its symmetric design and the physical properties of the carbon fiber, ABS plastic and aramid cables used to build it.

The foregoing description, for purpose of explanation, has been described with reference to specific embodiments. However, the illustrative discussions above are not intended to be exhaustive or to limit the disclosure to the forms presented here. Many modifications and variations are possible in view of the elements that were above disclosed. The embodiments were chosen and described in order to clarify the principles involved in the development and operation of the airship as well as their practical uses, thus allowing other persons skilled in the subject, a broader perspective on potential alternative embodiments to be developed from modifications that can demonstrate as suited to the particular use here contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that performs particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types.

The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An unmanned airship, comprising:
a body of an unmanned flight device;
a single inflatable envelope filled with a gas having an ellipsoid shape and connected to the body of the unmanned flight device that provides a portion of the lift to the unmanned flight device;
two or more rotors connected to the body of the unmanned flight device and located underneath the single inflatable envelope that provide a second portion of the lift to the unmanned flight device;
a control box, that is part of the body of the unmanned flight device, underneath a center of the single inflatable envelope and each of the two or more rotors being connected to the control box; and
wherein the airship has a systemic symmetry based on the single inflatable envelope, the control box underneath the center of the single inflatable envelope and the two or more rotors adjacent the periphery of the single inflatable envelope for weight distribution and flight control of the airship.

2. The airship of claim 1, wherein the single inflatable envelope is a balloon.

3. The airship of claim 2, wherein the balloon is a helium filled balloon that is made of polyurethane.

4. The airship of claim 1, wherein the body of the unmanned flight device is lifted by a combination of the two or more rotors and the single inflatable envelope.

5. The airship of claim 4, wherein the portion of the lift provided by single inflatable envelope is 70-90% and the second portion of the lift provided by the two or more rotors is 30-10% for a total of 100% of the lift of the unmanned flight device.

6. The airship of claim 1, wherein the two or more rotors further comprises five rotors and further comprises a plurality of rods that connect the five rotors to the control box that are configured in a star configuration with the control box at a center of the star and each rotor at a point of the star.

7. The airship of claim 1, wherein the control box further comprises flight electronics that control the unmanned flight device from a pilot on the ground and a battery connected to the two or more rotors and the flight electronics.

8. The airship of claim 7, wherein the control box further comprises an electronic speed controller connected to each rotor to control the speed of each rotor.

9. The airship of claim 1, wherein the two more rotors further comprising six rotors and wherein the rods further comprises a total of six rods that each connect one of the six rotors to the control box and wherein the single inflatable envelope is connected to the unmanned flight device at the control box and at an end of each rod.

10. The airship of claim 1, wherein the two more rotors further comprising six rotors and each rotor is adjacent the periphery of the single inflatable envelope.

* * * * *